United States Patent
Seib

(10) Patent No.: US 7,364,381 B2
(45) Date of Patent: Apr. 29, 2008

(54) PIVOTAL CONNECTOR ASSEMBLY

(75) Inventor: David D. Seib, Saskatoon (CA)

(73) Assignee: CNH Canada, Ltd. (CA)

( * ) Notice: Subject to any disclaimer, the term of this patent is extended or adjusted under 35 U.S.C. 154(b) by 247 days.

(21) Appl. No.: 10/940,032

(22) Filed: Sep. 14, 2004

(65) Prior Publication Data

US 2006/0056910 A1    Mar. 16, 2006

(51) Int. Cl.
*F16J 1/18*    (2006.01)

(52) U.S. Cl. .................... 403/154; 403/151; 403/319; 411/315; 411/355

(58) Field of Classification Search ............... 411/351, 411/355, 315, 316, 319, 320; 403/316–319, 403/151, 154, 155, 156
See application file for complete search history.

(56) References Cited

U.S. PATENT DOCUMENTS

| | | | | |
|---|---|---|---|---|
| 1,348,727 | A * | 8/1920 | McKinlay | 411/355 |
| 3,049,252 | A * | 8/1962 | Noll | 414/723 |
| 3,638,980 | A * | 2/1972 | Kleinhenn | 411/320 |
| 3,988,899 | A | 11/1976 | Dougherty | |
| 4,013,182 | A * | 3/1977 | Pratt et al. | 414/723 |
| 4,203,684 | A * | 5/1980 | Stecklein | 403/158 |
| 4,477,202 | A | 10/1984 | Price | |
| 5,927,665 | A * | 7/1999 | Grabnic | 248/200 |
| 5,951,192 | A * | 9/1999 | Collins | 403/154 |
| 6,336,785 | B1 * | 1/2002 | Kunzman | 414/723 |
| 6,662,681 | B2 * | 12/2003 | Crane et al. | 74/571.1 |
| 6,698,932 | B2 * | 3/2004 | Hamaguchi et al. | 384/275 |
| 2002/0081046 | A1 * | 6/2002 | Hamaguchi et al. | 384/276 |

OTHER PUBLICATIONS

Kalpakjian, Serope; Manufacturing Engineering and Technology, 1995, Addison-Wesley, Third Edition, p. 942.*

* cited by examiner

*Primary Examiner*—Daniel P. Stodola
*Assistant Examiner*—Michael P. Ferguson
(74) *Attorney, Agent, or Firm*—Rebecca Henkel

(57) ABSTRACT

A connector assembly pivotally couples a caster assembly with a pivot arm of an agricultural implement. The connector assembly includes first and second structural support plates having openings to receive a connector pin therethrough pivotally coupling the arm between the plates. A fixed collar having a bore, and a lock pin passage aligned perpendicular thereto, is fixed at one of the first or second structural support plates to receive the connector pin therethrough. The connector pin includes a first end having an exterior threaded portion and a second end having a connector pin opening. The connector pin opening and the lock pin opening receive a lock pin therethrough that secures a position of the connector pin in the collar. Tightening a nut at the threaded end of the connector causes the structural support plates to squeeze against the arm, enhancing lateral support of the arm.

8 Claims, 3 Drawing Sheets

PIVOTAL CONNECTOR ASSEMBLY

FIELD OF INVENTION

The invention relates to a connector assembly and, more particularly, to a connector assembly having a lock pin configured to pivotally couple a pivot arm with a caster assembly of an agricultural implement.

BACKGROUND OF INVENTION

Agricultural implements typically employ numerous types of pivotal connector assemblies in coupling various tools, structures, caster or wheel assemblies, etc. associated with operation of the agricultural implement.

A certain known connector assembly 20 is illustrated on FIGS. 4 and 5. The connector assembly 20 is generally employed to pivotally couple a vertical shaft 25 of a rotatable caster or caster assembly 30 to pivot arms or linkages 36, 38 of an agricultural implement (not shown). The connector assembly 20 generally includes a housing or bracket 40 that in combination with one or more pins 46, 48 pivotally connects the pivot arms or linkages 36, 38 with the caster assembly 30. The preferred housing 40 includes a first structural plate 50 and a second structural plate 55 configured to receive the pivot arms 46, 48 therebetween. The coupling pins 46, 48 each generally includes a first end 60, 62 having a threaded portion and a second end 66, 68 having a threaded portion, respectively. The threaded portion of the first ends 60, 62 of the coupling pin 46, 48 receive coupling nuts 70, 72, respectively. The first structural plate 50 further includes collars 76, 78 having bores or passages 80, 82 configured to receive the coupling pins therethrough, respectively. In assembly, the coupling pins 46, 48 insert through the bores 80, 82 in the collars 76, 78, the pivot arms 36, 38, and both structural support plates 50, 55. The end portions of the bores 80, 82 in the collars 76, 78 are polygonal-shaped in corresponding relation to receive the polygonal-shaped nuts 70, 72 welded at the first end 60, 62 of the coupling pins 46, 48. The threaded portion of the second end 66, 68 of the coupling pins 46, 48 receives coupling nuts 86, 88. With the coupling nuts 70, 72 restrained by the polygonal-shaped end portions of the bores 80, 82 in the collars 76, 78, the second nuts 86, 88 can be tightened against the second structural plate 55 to secure the coupling pins 46, 48 with the structural support plates 50, 55.

However, this certain known coupling assembly 20 has drawbacks. Cutting the threaded portions at both ends 60, 62, of the coupling pins 46, 48 is cumbersome and time consuming. Moreover, cutting the polygonal-shaped end portions of the bores 80, 82 in the collars 76, 78 to accommodate and restrain the coupling nuts 70, 72 is also costly and time consuming.

There is thus a need for an agricultural implement that employs a connector assembly that can be readily assembled and disassembled. Furthermore, there is a need for a connector assembly that provides sufficient lateral support to accommodate lateral forces on the pivot arm associated with operation of the agricultural implement on an agricultural terrain or field.

SUMMARY OF THE INVENTION

The present invention provides a connector assembly in pivotal support of an arm having an opening that extends therethrough. The connector assembly includes a first structural support plate in generally parallel alignment with, and spaced apart from, a second structural support plate. The first and second structural support plates are configured to receive the arm therebetween. The first support plate includes a first opening and the second support plate includes a second opening in general concentric alignment with the first opening in the first support plate. The connector assembly further includes a collar attached at, and having a bore or passage in concentric relation to, the opening in the first structural support plate. The collar includes a collar pin passage aligned generally perpendicular to the passage. The connector assembly further includes a connector pin pivotally coupling the arm between the first and second structural support plates. The connector pin is received through the bore of the collar, the first structural support plate opening, the second structural support plate opening and the opening in the arm in pivotal support of the arm. The connector pin includes a first end and a second end, the first end having an exterior threaded portion and the second end having a connector pin opening extending diametrically therethrough. The connector further includes a connector pin nut having threaded interior configured to receive the exterior threaded portion of the connector pin. The connector assembly further includes a lock pin received through the connector pin opening of the connector pin and the collar pin opening of the collar. The lock pin secures a location or position of the connector pin relative to the first and second structural support plates. Rotation of the connector pin nut, in combination with the lock pin fixed in the connector pin and collar, causes the tightens or squeezes the first support plate and the second plate against the support arm therebetween, which enhances lateral support of the arm.

The preferred embodiment of the connector assembly further includes at least one washer mounted on the connector pin between the connector pin nut and the second structural support plate. The collar pin opening of the collar and the connector pin opening receive the lock pin therethrough so as to secure a position of the connector pin with respect to the first and second structural support plates. The lock pin includes a first end with a head portion opposite a second end with an exterior threaded portion. The connector assembly further includes a lock pin nut having a threaded interior that receives the threaded exterior portion of the lock pin so as to secure the lock pin in the connector pin opening and the collar pin opening.

In another embodiment, the present invention provides an agricultural implement that includes a mainframe, at least one caster assembly in support of the main frame, at least one arm in pivotal support of the caster assembly with the main frame, and a connector assembly. The arm generally includes a first end and a second end. The first end is pivotally coupled to the main frame and the second end is pivotally coupled to the connector assembly.

The connector assembly generally includes a first structural support plate in generally parallel alignment with, and spaced apart from, a second structural support plate. The first and second structural support plates are configured to receive the second end of the arm therebetween, as well as a vertical shaft or support of the caster assembly. The first support plate includes a first opening and the second support plate includes a second opening in general alignment with the first opening in the first support plate. The connector assembly further includes a collar attached at, and having a bore or passage in concentric relation to, the first opening in the first support plate. The collar further includes a collar pin opening aligned generally perpendicular to the passage. The connector assembly further includes a connector pin pivotally coupling the arm between the first and second structural support plates. The connector pin is received through the bore in the collar, the first structural support plate opening, the second structural support plate opening and the opening through the second end of the arm. The connector pin includes a first end having an exterior threaded portion and a second end having a connector pin opening extending therethrough. The connector assembly further includes a connector pin nut having threaded interior to receive the exterior threaded portion of the connector pin. The connector assembly further includes a lock pin received through the connector pin opening. Rotating the connector pin nut relative to the connector pin tightens or squeezes the first and second structural support plates against the support arm therebetween. The connector assembly thereby allows the support arm to pivot about the connector pin between the first and second structural support plates, as well as enhances lateral support of the arm to resist forces acting on the arm associated with operation of the implement on an agricultural terrain or field.

In another embodiment, the present invention provides a method of pivotally coupling a first end of a support arm between a first support and a second support of a housing. The method includes the steps of receiving the first end of the support arm between the first and second support of the housing; inserting a connector pin through a first opening in the first support, a second opening in the second support, an opening in the first end of the support arm, and a collar that defines a passage in concentric relation to the first opening in the first support; securing the position of the connector pin relative to the housing by inserting a lock pin through a connector pin opening of the connector pin and a collar opening of the collar; and squeezing the first and second supports against the first end of the support arm therebetween.

The preferred squeezing step includes receiving a tightening nut on a threaded end of the connector pin opposite the lock pin, and tightening the tightening nut against the second support of the housing relative to the position of the connector pin fixed by the lock pin in the collar opening of the collar. The preferred lock pin includes a head portion and an exterior threaded portion, and the preferred securing step includes receiving a lock pin tightening nut at the threaded end portion of the lock pin. The first end of the preferred support arm includes a sleeve that defines the opening therethrough to receive the connector pin, and the preferred squeezing step includes squeezing the first support and the second support against opposite ends of the sleeve.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
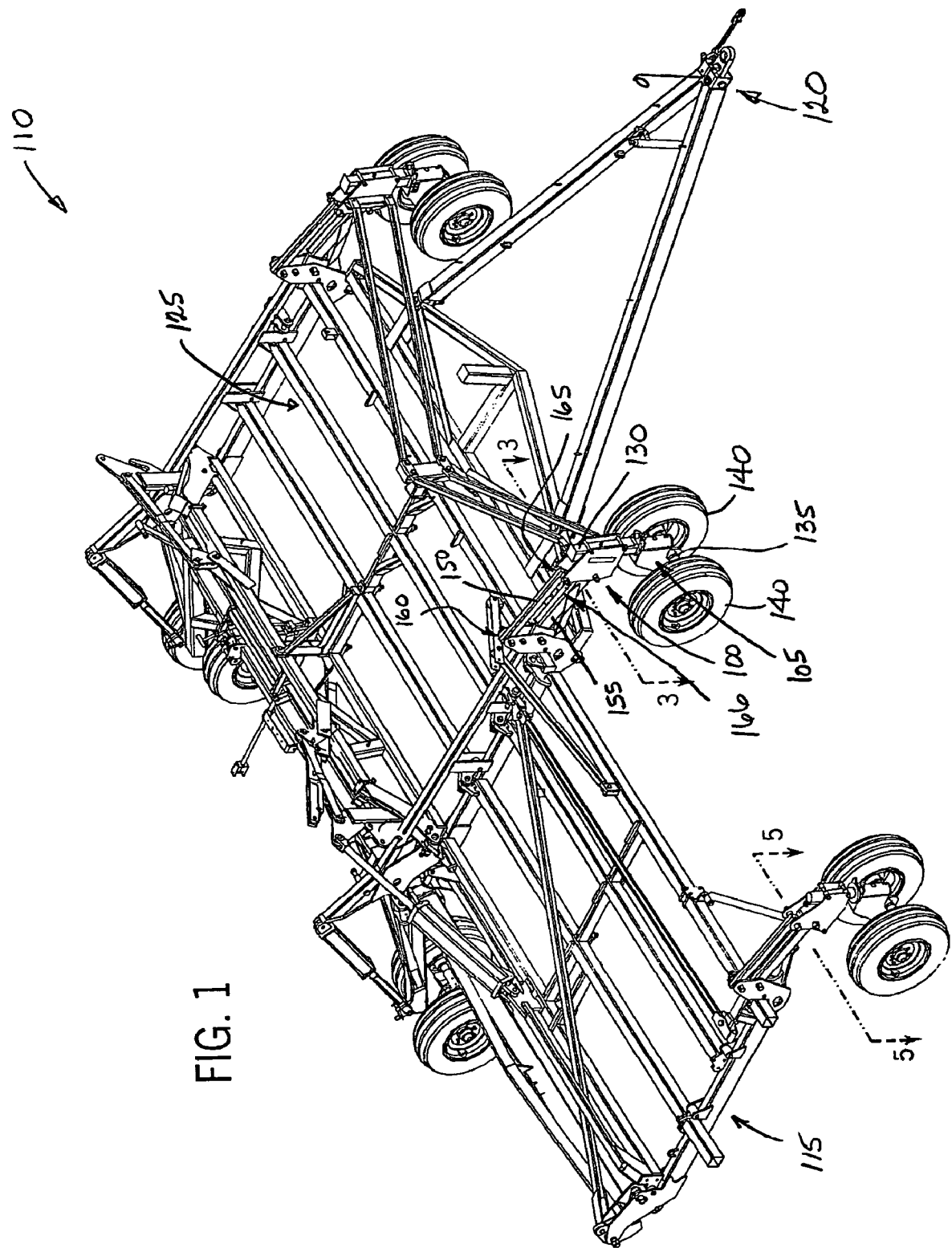
FIG. 1 illustrates an isometric view of an agricultural implement having a caster assembly pivotally connected by a connector assembly in accordance with the present invention.

A wide variety of machines or systems could be constructed in accordance with the invention defined by the claims. Hence, even though the exemplary embodiment of a connector assembly 100 in accordance with the invention will be generally described with reference to a caster assembly 105 of an agricultural implement 110 as shown in FIG. 1, the application of the connector assembly 100 is not so limited. The connector assembly 100 of the invention could be employed to couple, mount, or support by a wide variety of structures, machines, tools or mechanical assemblies, etc., and is not limiting on the invention.

As shown in FIG. 1, the preferred agricultural implement 110 includes a mainframe 115 interconnected with a hitch 120 and a tool bar 125. The hitch 120 is configured to be coupled to a tow vehicle (not shown). The tool bar 125 is configured to support various tools (not shown) to be used in agricultural planting, tilling, etc. operations. The types of tools can vary. The connector assembly 100 generally mounts the mainframe 115 on the caster or wheel assemblies 105 in support of the implement 110 to be towed by the tow vehicle across an agricultural terrain or field.

Figure 2:
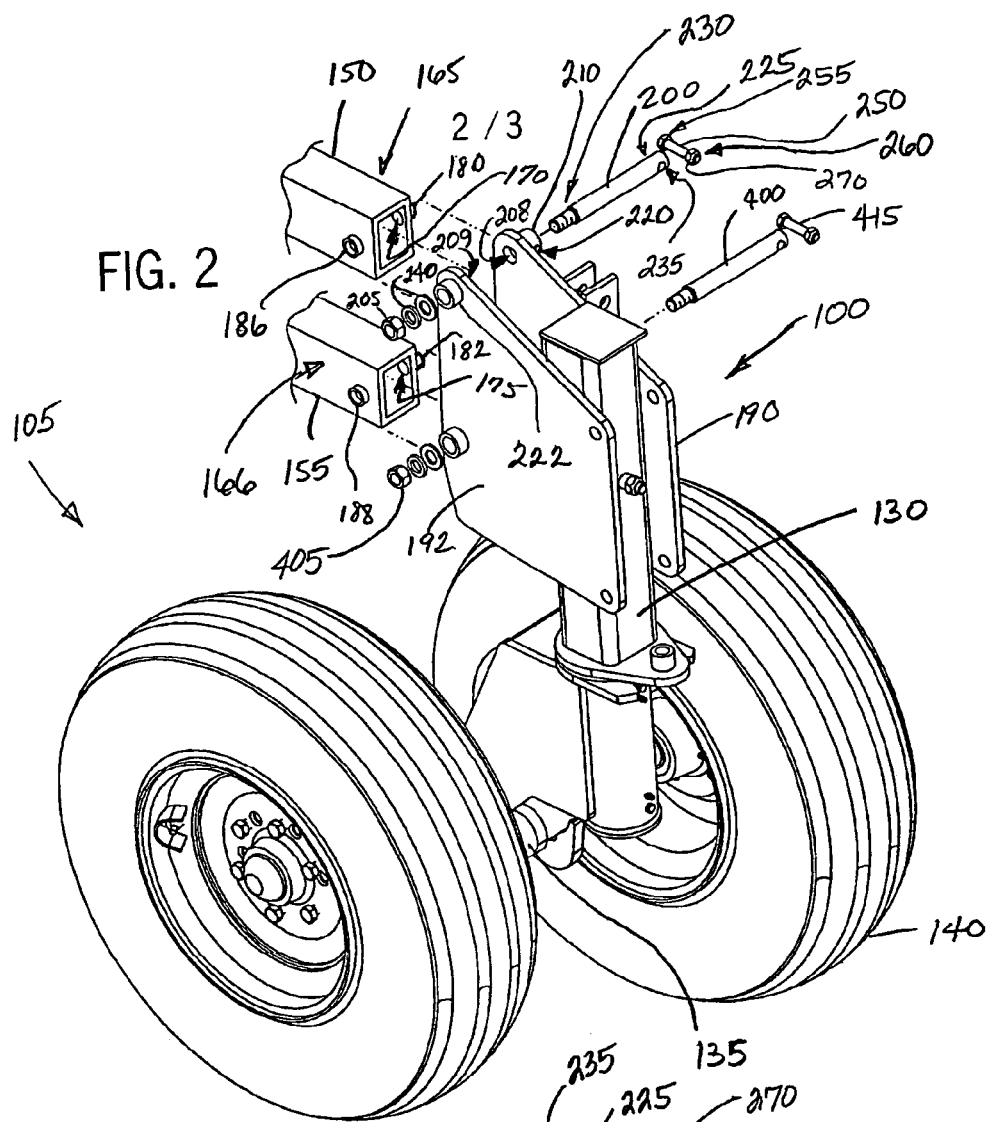
FIG. 2 illustrates a detailed isometric exploded view of the connector assembly and the caster assembly of FIG. 1.

Referring to FIG. 2, the preferred caster assembly 105 includes a vertical support 130 rotationally mounted on a horizontal shaft 135 in support of one or more wheels 140. The connector assembly 100 mounts the vertical shaft 130 of the caster assembly 105 to the mainframe 115 of the agricultural implement 110. The vertical shaft 130 is configured to allow the one or more wheels 140 to variably be rotated or oriented 360-degrees about the vertical shaft 130. The preferred vertical shaft 130 includes a generally square or rectangular shaped portion that is received by the connector assembly 100.

Referring to FIGS. 1 and 2, an upper arm 150 and a lower arm 155 pivotally link each connector assembly 100 and mounted caster assembly 105 with the main frame 115 of the agricultural implement 110. As illustrated in FIG. 1, each upper and lower arm 150, 155 generally includes a first end 160 pivotally coupled to the main frame 115, and a second end 165, 166 pivotally coupled to the connector assembly 100. The second end 165, 166 of each upper and lower arm 150, 155 generally includes an opening 170, 175 extending therethrough. As shown in FIG. 2, the second end 165, 166 of each upper and lower arm 150, 155, respectively, further includes a first arm collar 180, 182 opposite a second arm collar 186, 188, each located in general communication with the openings 170, 175 respectively, extending therethrough. The preferred upper and lower arms 150 and 155 are tubular shaped, but the type (e.g., bars, etc.) of arms 150, 155 can vary.

The connector assembly 100 is configured to pivotally connect the caster assembly 105 with the second ends 165, 166 of the arm 150, 155. In addition to supporting the caster assembly 105 on the arms 150, 155 and mainframe 115, the connector assembly 100 also enhances lateral support of the arms 150, 155 against miscellaneous lateral forces associated with operation of the agricultural implement 110 on a rough terrain or field.

As shown in FIG. 2, the preferred connector assembly 100 generally includes a first structural support plate 190 and a second structural support plate 192 configured to receive the pivot arms 150 and 155 therebetween. The first pivot arm 150 is pivotally coupled by a connector pin 200 and a connector nut 205 between the first and second structural support plates 190, 192.

Figure 3:
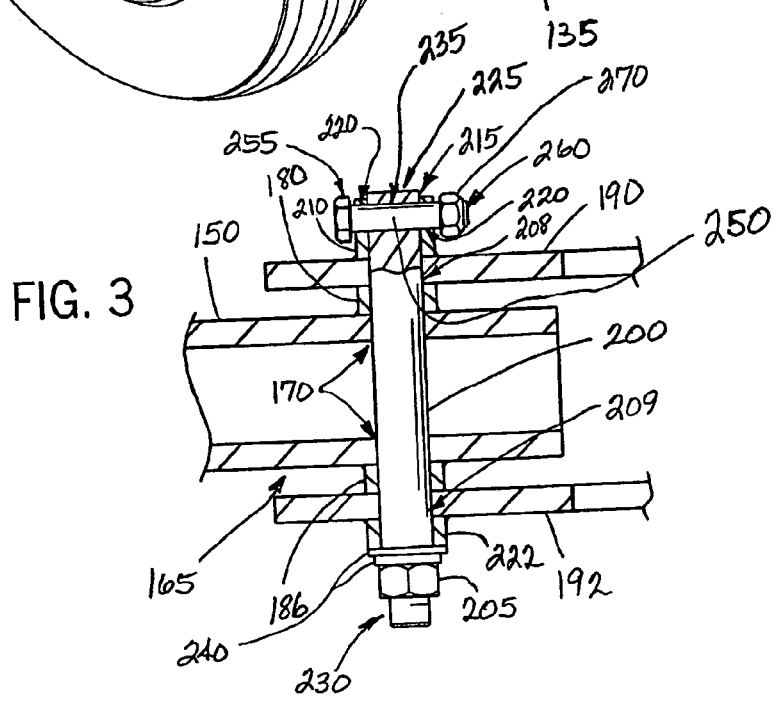
FIG. 3 illustrates a detailed cross-sectional view of the connector assembly along line 3-3 of FIG. 1.
Figure 4:
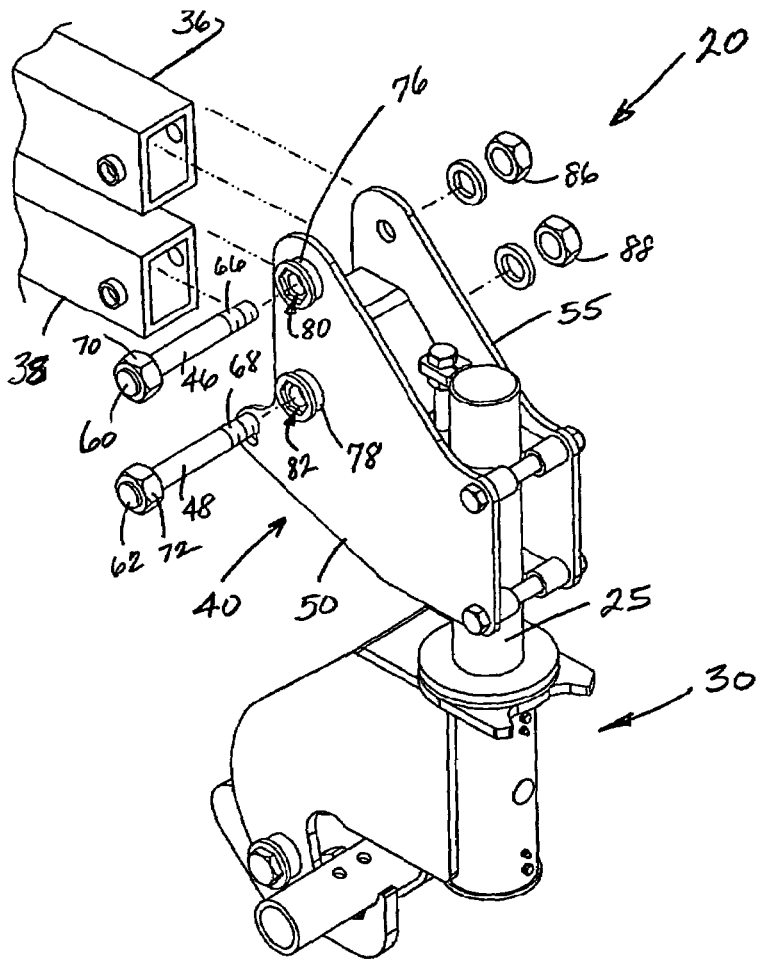
FIG. 4 shows a detailed isometric exploded view of a known connector assembly configured with a caster assembly.
Figure 5:
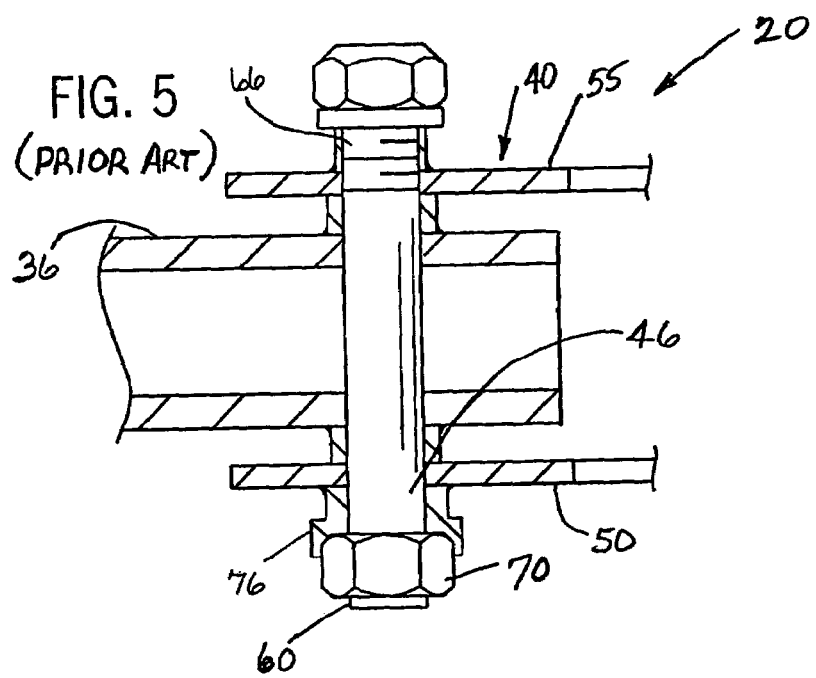
FIG. 5 illustrates a detailed cross-sectional view of the known connector assembly of FIG. 4.

Hereinafter, the connector assembly 100 in combination with the first pivot arm 150 will be discussed in detail. The connector assembly 100 assembled in combination with the second pivot arm 155 is constructed in a like manner to the first pivot arm 150 and so is not discussed in detail. Referring now to FIG. 3, the preferred embodiment of the connector assembly 100 includes the first structural support plate 190 in generally parallel relation with, and spaced apart from, the second structural support plate 192 so as to receive the second end 165 of the support arms 150, as well as the vertical shaft 130 of the caster assembly 105 (See FIG. 2), therebetween. The first structural support plate 190 includes a first opening 208 and the second structural support plate 192 includes a second opening 209 in generally concentric relation relative to the first opening 208 in the first structural support plate 190. The first structural support plate 190 is engaged against the first arm collar 180, and the second structural support plate 192 is engaged against the second arm collar 186, of the pivot arm 150.

Still referring to FIG. 3, a lock pin collar 210 is attached at the first opening 208 in the first structural support plate 190. The lock pin collar 210 generally includes a bore 215 in general concentric relation to the first opening 208 in the first structural support plate 190. The lock pin collar 210 further includes a collar pin passage 220 that is aligned generally perpendicular to the bore 215. Although the illustrated lock pin collar 210 is attached at the first opening 208 of the first structural plate 190, the connector assembly 100 can be constructed in a flipped configuration where the collar 210 is alternatively attached at the second opening 209 of the second structural plate 192. Also, the connector assembly 100 further includes a second collar 222 attached at the second opening 209 in the second structural support plate 192.

The connector pin 200 pivotally couples the second end 165 of the pivot arm 150 between the first and second structural support plates 190, 192. The connector pin 200 is received through the bore 215 of the collar 210 and the first and second openings 208, 209 in the first and second structural support plates 190, 192, respectively. The connector pin 200 includes a first end 225 and a second end 230. The first end 225 of the connector pin 200 includes a lock pin opening 235 extending through the connector pin 200, and the second end 230 of the connector pin 200 includes an exterior threaded portion. The connector pin nut 205 includes a threaded interior configured to receive the exterior threaded portion of the second end 230 connector pin 200 to secure assembly of the connector pin 200 and pivot arm 150 with the first and second structural support plates 190, 192. The connector pin nut 205 can also be rotated to selectively tighten or squeeze the first and second structural support plates 190, 192 against the pivot arm 150 therebetween. The connector assembly 100 can further include one or more washers 240 mounted on the connector pin 200 between the connector pin nut 205 and the second collar 222 to enhance lateral restraint of the pivot 150 between the first and second structural support plates 190, 192.

Still referring to FIG. 3, a lock pin 250 secures a position of the connector pin 200 relative to the lock pin collar 210 and the attached first structural plate 190. The lock pin 250 is received through the lock pin opening 235 in the connector pin 200 and the collar pin passage 220 of the lock pin collar 210. The preferred lock pin 250 includes a first end 255 with a head portion opposite a second end 260 with an exterior threaded portion. A lock pin nut 270 having a threaded interior is configured to receive the threaded exterior portion of the second end 260 of the lock pin 250 to secure the lock pin 250 in the lock pin opening 235, and thereby secure the connector pin 200 in the lock pin collar 210.

In operation, the first end of the pivot arm 150 is pivotally coupled to the main frame 115 of the agricultural implement 110. The first and second structural support plates 190, 192 receive the second end 165 of the pivot arm 150. The vertical shaft 130 of the caster assembly 105 is also received between the first and second structural support plates 190, 192 in such a manner that the main frame 115 is pivotally mounted on the caster assembly 105. The connector pin 200 is inserted through the first opening 208 in the first structural support plate 190, the second opening 209 in the second structural support plate 192, the opening 170 in the second end 165 of the support arm 150, and the bore 220 of the lock pin collar 210 attached at the first structural support plate 192. The connector pin 200 is secured in the lock pin collar 210 by inserting the lock pin 250 through the lock pin opening 235 in the connector pin 200 and the collar pin passage 220 in the lock pin collar 210. The lock pin nut 270 threads on the threaded end portion 260 of the lock pin 250 to secure the lock pin 250 with the connector pin 200 and lock pin collar 210. The connecting pin nut 205 is received on the threaded end portion 230 of the connector pin 200. Tightening the connecting pin nut 205 on the connector pin 200 in combination with restraining the connector pin 200 with the locking pin 250 in the lock pin collar 210 causes the first and second structural support plates 190, 192 to squeeze against the first and second collars 180, 186 of the pivot arm 150 therebetween. In addition to pivotally connecting the caster assembly 105 on the pivot arm 150, this squeezing of the support plates 190, 192 inward against the pivot arm 150 enhances lateral support of the pivot arm 150.

As illustrated in FIG. 2, the connector assembly 100 also pivotally couples the second pivot arm 155 with a second connector pin 400, second pin nut 405, second lock pin collar (not shown), and second lock pin 415 constructed and assembled in a similar manner to the connector pin 200, connector pin nut 205, lock pin collar 210 and lock pin 250 described above. The connector assembly 100 can be configured to pivotally couple any number of pivot arms. Moreover, the connector assembly can be employed to pivotally couple the first end of the pivot arm at the main frame.

Many changes and modifications could be made to the invention without departing from the spirit thereof. The scope of these changes will become apparent from the appended claims.

I claim:

1. A connector assembly for pivotally supporting an arm, the arm including an opening that extends therethrough, the connector assembly comprising:

a first structural support plate and a second structural support plate configured to pivotally receive the arm therebetween, the first structural support plate having a first opening and the second structural support plate having a second opening;

a collar fixed at the first structural support plate and having an inner surface defining a bore in concentric relation to the first opening in the first structural support plate, the collar further including a collar pin opening aligned perpendicular to the bore;

a connector pin having an outer surface and pivotally coupling the arm between the first and second structural support plates, the connector pin received through the bore of the collar and the first and second openings in the first and second structural support plates, respectively, the connector pin including a first end having an exterior threaded portion and a second end being free of threads and having a lock pin opening extending therethrough;

a connector pin nut having threaded interior configured to receive the exterior threaded portion of the connector pin;

a lock pin received through the lock pin opening and the collar pin opening, wherein the lock pin includes a first end with a head portion opposite a second end with an exterior threaded portion; and a lock pin nut having a threaded interior that receives the threaded exterior portion of the lock pin to secure the lock pin in the connector pin opening and the collar pin opening;

wherein:

the lock pin prevents rotation of the connector pin;

rotation of the connector pin nut on the connector pin selectively urges the first and second structural support plates towards each other;

the arm is laterally supported between the first and second structural support plates; and the outer surface of the connector pin engaging the inner surface of the collar.

2. The assembly as recited in claim 1, further including a lock washer mounted on the connector pin between the connector pin nut and the second structural support plate.

3. An agricultural implement, comprising:

a main frame;

at least one caster assembly;

at least one arm having a first end and a second end, the first end pivotally coupled to the main frame;

a connector assembly in rotatable support of the caster assembly, the connector assembly comprising:

a first structural support plate and a second structural support plate configured to pivotally receive the second end of the arm therebetween, the first structural support plate having a first opening and the second structural support plate having a second opening;

a collar attached at the first structural support plate and having an inner surface defining a bore in concentric relation to the first opening in the first structural support plate, the collar further including a collar pin passage aligned perpendicular to the bore;

a connector pin having an outer surface and pivotally coupling the arm between the first and second structural support plates, the connector pin received through the bore of the collar and the first and second openings in the first and second structural support plates, respectively, the connector pin including a first end and a second end, the first end having an exterior threaded portion and the second end being free of threads and having a lock pin opening extending therethrough;

a connector pin nut having threaded interior configured to receive the exterior threaded portion of the connector pin;

a lock pin received through the lock pin opening and the collar pin passage, wherein the lock pin includes a first end with a head portion opposite a second end with an exterior threaded portion; and a lock pin nut having a threaded interior that receives the threaded exterior portion of the lock pin, wherein the lock pin nut secures the lock pin with the connector pin in the collar pin passage of the collar; opening, wherein:

the lock pin prevents rotation of the connector pin;

rotation of the connector pin nut on the connector pin selectively urges the first and second structural support plates towards each other;

the connector assembly fixes and provides lateral support to the arm between the first and second structural support plates; and the outer surface of the connector pin in engagement with the inner surface of the collar.

4. The agricultural implement as recited in claim 3, further including a lock washer mounted on the connector pin between the connector pin nut and the second structural support plate.

5. The agricultural implement as recited in claim 3, wherein the second end of the arm includes a first arm collar opposite a second arm collar and the opening located in communication therebetween, and wherein the first structural support plate is engaged against the first arm collar and the second structural support plate is engaged against the second arm collar.

6. The agricultural implement as recited in claim 3, wherein the connector assembly is configured to rotatably support a vertical shaft extending upward from the caster assembly.

7. The agricultural implement as recited in claim 3, further comprising a second collar having a bore in general concentric relation to the second opening of the second structural support plate.

8. The agricultural implement as recited in claim 3, further comprising:

a second arm pivotally coupled at the main frame and at the connector assembly, the second arm pivotally coupled by a second connector pin between the first and second structural support plates.

* * * * *